BEST AVAILABLE COPY
J. O'CONNOR.
PERFORATED NOTE SHEET GUIDE.
APPLICATION FILED DEC. 12, 1911.
Reissued Apr. 2, 1912. 13,398.
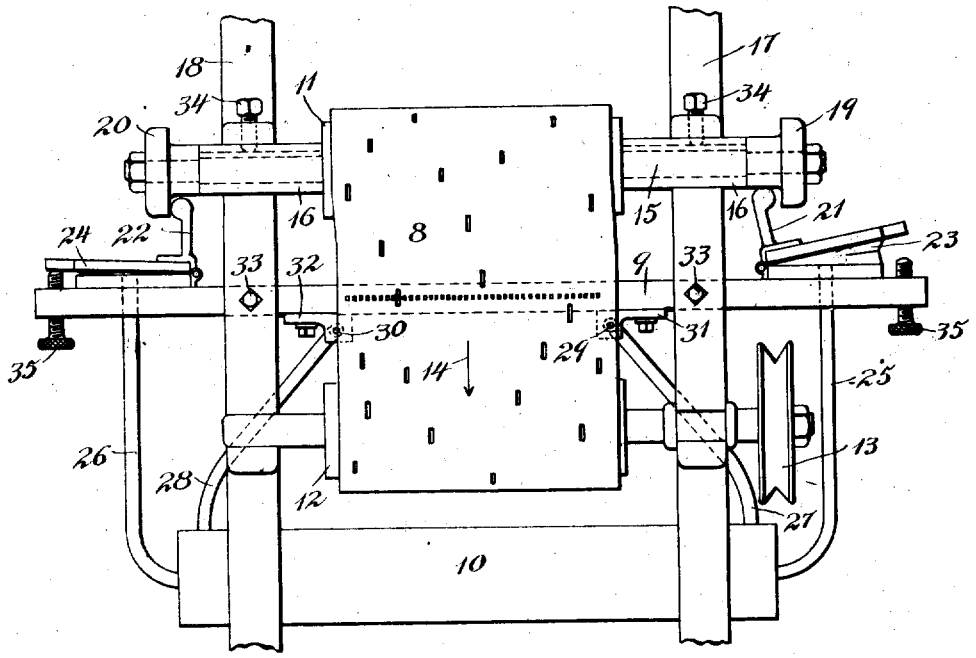
Witnesses:
Benj. H. Hammond
F. E. Gibson
Inventor:
James O'Connor
by Southgate & Southgate Atty's

BEST AVAILABLE COPY

UNITED STATES PATENT OFFICE.

JAMES O'CONNOR, OF NEW YORK, N. Y., ASSIGNOR TO AUTOPIANO CO., OF NEW YORK, N. Y., A CORPORATION OF NEW YORK.

PERFORATED-NOTE-SHEET GUIDE.

13,398. Specification of Reissued Letters Patent. Reissued Apr. 2, 1912.

Original No. 789,053, dated May 2, 1905, Serial No. 20,840. Original Reissue No. 13,253, dated August 15, 1911, Serial No. 618,872. Application for this reissue filed December 12, 1911. Serial No. 665,410.

*To all whom it may concern:*

Be it known that I, JAMES O'CONNOR, a citizen of the United States of America, and a resident of the city, county, and State of New York, have invented a new and useful Perforated-Note-Sheet Guide, of which the following description and claims constitute the specification, and which is illustrated by the accompanying drawing.

The object of this invention is to constantly maintain correct registration, between the perforations in a note-sheet and the corresponding music apertures in the tracker-bar, of an automatic musical instrument; and its nature is a combination of pneumatic and mechanical elements.

The principle of this invention, in whatever mode it is embodied, is as follows: Correct registration, between the perforations in the note-sheet and the corresponding music apertures in the tracker-bar, is constantly maintained, by two bellows-motors, which work mechanically in opposite directions, but which are worked by atmospheric pressure, which pressure is constantly governed, but not produced by the presence or absence, as the case may be, of tendency to lateral movement of the note-sheet upon the tracker-bar.

The accompanying drawing is a plan view of the best mode in which I have contemplated applying the principle of this invention.

The numeral 8 indicates a perforated note-sheet, being drawn over the music apertures of the tracker-bar 9, from the music roll, 11, by the drawing roll 12; which drawing roll is so rotated through the pulley 13, as to draw the note-sheet in the direction of the arrow 14. The music roll 11, includes the roller 15 as its shaft; and that roller revolves in the two bearings 16, which rest in seats in the frame pieces 17 and 18; from which they may be readily removed as occasion requires. The shaft 15 is provided with the thrust collars 19 and 20, at its opposite ends; which thrust collars are located in engaging relations to the arms 21 and 22, respectively; and which arms are fixed to the movable sides of the bellows motors 23 and 24, respectively; and which bellows motors are connected by the air tubes 25 and 26, respectively, with certain old and well known pneumatic apparatuses in the interior of the air-chest 10; and which apparatuses are respectively connected, through the air-pipes 27 and 28, with the pneumatic guide openings 29 and 30, which are appurtenant to the tracker-bar and are carried on independent blocks 31 and 32, clamped to the tracker-bar by screws.

The bellows motors 23 and 24, are mounted upon the ends of the tracker-bar 9; and the tracker-bar may slide lengthwise in its seats in the frame pieces 17 and 18, or may be clamped to those frame pieces by the screws 33. So also the bearings 16 of the roller 15, may slide lengthwise in their seats in those frame pieces, or may be clamped thereto by the screws 34. When the tracker-bar 9 is clamped, and the bearings of the roller 15 are unclamped, either of the bellows motors can move the music roll 11 lengthwise; and when the tracker-bar is unclamped and the bearings of the roller 15 are clamped, either of the bellows motors can move the tracker-bar lengthwise; the effect in either case being to adjust the registration of the perforations in the music sheet with the music apertures in the tracker-bar. The adjusting screws 35 occupy screw threaded holes in the ends of the tracker-bar 9, and may be employed to limit the collapsing movements of the bellows motors 23 and 24, respectively.

The mode, which is shown in the drawing, of applying the principle of my invention, operates as follows: When the note-sheet is traveling accurately over the tracker-bar, the guide openings 29 and 30 are both closed by the note-sheet; and there is no pneumatic connection between the air-tubes 27 and 28, and 25 and 26, respectively. If, thereupon, for any reason, that zone of the note sheet which is over the tracker-bar is deflected slightly to the right, as indicated in the drawing, that deflection operates to begin to uncover the guide-opening 30; whereupon one of the old and well known apparatuses in the interior of the air-chest 10, sucks air through that opening and through the air-tube 28, into itself, and that incoming air presses open a certain valve in that apparatus, the opening of which results in so connecting the air-tube 26 with the continuously existing suction through that apparatus, as to suck air from the interior

BEST AVAILABLE COPY of the bellows motor 24, and thus cause it to be partly collapsed by exterior air pressure. This partial collapsing of the bellows motor 24, operates through the arm 22, to pull the music roll 11 slightly to the left, or push the tracker-bar 9 slightly to the right, as the case may be, and thus maintains the registration between the perforations in the note-sheet, and the music apertures in the tracker-bar. That slight relative movement of the note-sheet and the tracker-bar, carries the guide-opening 30 again under the note-sheet, and thus stops further movement of air inward through that guide-opening, and into the air-tube 28; and that stoppage operates to prevent further movement of air from the interior of the bellows motor 24, through the air-tube 26, and to prevent further collapsing of that bellows motor. If afterward, that zone of the note-sheet which is over the tracker-bar, is deflected to the left far enough to begin to uncover the guide opening 29, that old pneumatic apparatus in the air chest 10, to which the air tube 27 leads, will operate to draw air through that guide opening and through that air tube, into itself, and that incoming air presses open a valve, the opening of which will result in the continuously existing suction in that apparatus, drawing air through the air tube 25 from the interior of the bellows motor 23, and thus causing it to be partly collapsed by exterior air pressure. That movement of that bellows-motor will thereupon pull the music roll 11 slightly to the right, or push the tracker-bar 9 slightly to the left, as the case may be, with the result of somewhat expending the bellows-motor 24, and thus preparing it to repeat its former operation, whenever the music sheet is again deflected to the right, far enough to begin to uncover the guide-opening 30.

The guide-openings 29 and 30, are shown in the drawing, as located almost as far apart as the width of the note-sheet. It follows from this location, that a very slight deflection of the note-sheet to the right, begins to uncover the guide-opening 30. That partial uncovering admits air enough to instantly inaugurate an instant, though slight collapsing movement of the bellows-motor 24. That collapsing movement causes the note-sheet to again close the guide-opening 30. That closing instantly inaugurates the instant stoppage of the collapsing movement of the bellows-motor 24. That stoppage occurs as soon as the movable side of that bellows-motor has moved inward a short distance, which is never more than four times greater than the corrected deflection of the note-sheet. The subsequent expanding movement of the bellows-motor 24, is correspondingly slight, for it is caused by a collapsing movement of the bellows-motor 23; which movement is about as slight as the previous collapsing movement of the bellows-motor 24. For these reasons, it is evident that the movable sides of the two bellows-motors normally vibrate through very short ranges.

I disclaim, as outside the principle of my invention, the following inventions, all of which were previously known and used. 1. All inventions for preventing lateral deflection of a traveling band, belt, sheet or web, by means of two fixed bars, brackets, plates, posts or rollers, which are placed adjacent to its edges, and which directly produce the preventive result, by their own immovable resistance to lateral deflection. 2. All inventions for correcting lateral deflection of a traveling band, belt, sheet, or web, by means of two movable bars, brackets, plates or rollers, which are placed adjacent to its edges, and which are caused to indirectly produce the correcting result by lateral pressure upon them, of the longitudinally moving edges of the band, belt, sheet or web, without assistance from any other motor. 3. All inventions for correcting lateral deflection of a traveling band, belt, sheet or web, by means of any mechanical apparatus, which does not begin to move the band, belt, sheet or web, until a long time after the beginning of the deflection to be corrected. 4. All inventions for correcting lateral deflection of a traveling band, belt, sheet or web, by means of any mechanical apparatus, which though beginning to move the band, belt, sheet or web, nearly contemporaneously with the beginning of the deflection to be corrected, does not correct that deflection until a long time after its beginning. 5. All inventions for correcting lateral deflection of a traveling band, belt, sheet or web, by means of mechanical apparatus, which though sometimes beginning to move the band, belt, sheet or web, nearly contemporaneously with the beginning of the deflection to be corrected, does not correct that deflection continuously, but only step by step. 6. All inventions for correcting lateral deflection of a traveling band, belt, sheet or web, by means of a roller, located crosswise of a reach thereof, and adapted to be so tilted, when in crosswise contact with one surface of that reach, as to guide the band, belt, sheet or web into its normal direction of travel, after being deflected therefrom. 7. All inventions for correcting lateral deflection of a traveling band, belt, sheet or web, by means of a wheel, turning on an axis which is located diagonally crosswise thereof, and is adapted, when in diagonal contact with one surface thereof, to guide the band, belt, sheet or web into its normal direction of travel, after having been deflected therefrom.

Many other modified arrangements of this

BEST AVAILABLE COPY device may be employed adapted to the requirements of different conditions or different machines in many ways that will obviously occur to those familiar with this art.

I claim as my invention:—

1. The combination with a sheet or web, of means, contacting with the surface of the web and held out of operation when the web is in its normal position, for guiding or restoring the web to that normal position when deflected or diverted therefrom.

2. The combination with a sheet or web, of means for guiding or restoring the web to its desired path when diverted therefrom and means, contacting with the surface of the web and held out of operation when the web is in its normal position, for inaugurating the operation of the guiding means.

3. The combination with the marginal surface of a traveling sheet or web, of means for guiding or restoring the web to its normal path when diverted therefrom, a tracker-bar, and means contacting with the marginal surface of the web and held out of operation when the web is in its normal position, for inaugurating the operation of the guiding means.

4. The combination, with an apparatus employing a traveling sheet or web, of means for maintaining the web and the apparatus in suitable operative relation, comprising means for deflecting the web or the apparatus into the desired relation, and means held out of operative engagement by the margin of the sheet for inaugurating the operation of the guiding means when the edge of the sheet is deflected or withdrawn from its normal position.

5. The combination, with a traveling sheet or web, of a tracker-bar, and means, maintained in inoperative condition by the sheet when in its normal position, for restoring the normal relation of the sheet and the tracker-bar when uncovered by the edge of the sheet.

6. The combination with the marginal surface of a traveling sheet or web, of a tracker-bar provided with contact devices arranged adjacent to and inside of the normal position of the edge of the sheet, so as to be covered by the marginal surface of the web when the latter is in its normal position, and means operable by the uncovering of the contact devices, for restoring the normal relation between the sheet and the tracker-bar.

7. The combination, with a traveling web, of pneumatic devices for restoring the web to normal position when deflected therefrom, and a tracker-bar, provided with contact devices located adjacent to and inside of the normal position of the edge of the web so as to be maintained in inoperative relation by the web while the latter is in normal position, whereby the operation of the pneumatic devices is inaugurated by the deflection or withdrawal of the web from the contact devices.

8. In a web-driving apparatus, means for restoring the web and the apparatus into normal relations when deflected therefrom, consisting of rolls for guiding the web, and a tracker-bar provided with an aperture adjacent to and within the normal position of the web so as to be covered thereby, and pneumatic devices, the operation of which is inaugurated by the uncovering of the aperture, for restoring the web or the tracker-bar to normal position.

9. In a web-driving apparatus, in combination with a roll thereof, a motor for moving the roll sidewise and means normally held out of operation by the interposition of the sheet when in its normal position for moving the roll sidewise to restore the web to normal position when deflected therefrom.

10. In combination with mechanism employing a traveling sheet or web, a tracker provided with a guide-opening, arranged to be closed by the sheet, when the latter is in its normal position, means for propelling the sheet across the tracker, and pneumatic devices governed by the guide-opening for adjusting the relation of the tracker and the sheet-propelling means when the opening is uncovered.

11. In combination with mechanism employing a traveling sheet or web, a tracker provided with a guide-opening arranged to be normally closed by the sheet when the latter is in normal position, rolls for propelling the sheet across the tracker, a bellows governed by the guide-opening, and engaging with the tracker and rolls, to adjust their relation, when the guide-opening is uncovered.

12. In combination with mechanism employing a traveling sheet or web, an adjustable tracker provided with a guide-opening arranged to be closed by the sheet when the latter is in its normal position, longitudinally adjustable rolls for propelling the sheet, and a bellows operatively governed by the guide-opening, and engaging with the tracker and rolls to adjust them when the guide-opening is uncovered.

13. In combination with mechanism employing a traveling sheet or web, an adjustable tracker provided with a guide-opening arranged to be closed by the sheet when the latter is in normal position, laterally-adjustable means for propelling the sheet across the tracker-bar, a bellows connected with the guide-opening, and engaging with the tracker and sheet-propelling means to effect their relative adjustment, and means for clamping either the tracker or the sheet propelling means in place, whereby the other may be employed as the adjustable member.

BEST AVAILABLE COPY

14. In combination with mechanism employing a traveling sheet or web, a tracker, means for propelling the sheet across the tracker, a bellows for adjusting the relation between the tracker and the sheet-propelling means, and means for regulating and adjusting the amplitude of movement of the bellows.

15. In combination with mechanism employing a traveling sheet or web, a tracker provided with an adjustable guide-opening.

16. In an automatic musical instrument, the combination of a tracker provided with a guide-opening arranged to be closed by the note-sheet when the latter is in its normal position, means for propelling the sheet across the tracker, and a bellows governed by the guide-opening, and adapted to adjust the relation of the tracker and the sheet-propelling means when the opening is uncovered.

17. In an automatic musical instrument, the combination of a tracker provided with a guide-opening, arranged to be closed by the note-sheet, when the latter is in normal position, means for propelling the sheet across the tracker, and a bellows governed by the guide-opening mounted upon the tracker and engaging with the sheet-propelling means, to adjust them when the guide-opening is uncovered.

18. In an automatic musical instrument, the combination of a tracker provided with a guide-opening, a delivery roll, and a take-up roll for drawing a note-sheet across said tracker, said guide-opening being arranged to be normally closed by the note-sheet, a shaft connected with one of said parts, and a bellows governed by said opening and engaging with the shaft to move the same when the opening is uncovered.

19. The combination, with a traveler sheet or web, of a tracker-bar, and means, maintained in inoperative condition by the sheet when in its normal position, for restoring the normal relation of the sheet and the tracker-bar when uncovered by the sheet.

20. In combination with mechanism employing a traveling sheet or web, a tracker provided with one or more guide-openings, arranged to be closed by the sheet, when the latter is in its normal position, means for propelling the sheet across the tracker, and pneumatic devices governed by the guide opening or openings for adjusting the relation of the tracker and the sheet-propelling means when the opening is uncovered.

21. The combination of a tracker-bar having a series of music apertures, means for drawing a perforated note-sheet forward over the tracker-bar, a pneumatic control opening appurtenant to the tracker-bar and arranged so that a lateral deviation of the note-sheet will change its condition, a pneumatic motor connected to adjust the lateral relation between the note-sheet and tracker-bar, and connections between said control opening and said pneumatic motor arranged so that when a lateral deviation of the note-sheet changes the condition of the control-opening, the pneumatic motor will operate to restore the normal lateral relation between the tracker-bar and note-sheet before the forward run of the note-sheet in abnormal lateral position can produce discord.

22. The combination of a tracker-bar having a series of music apertures, means for drawing a perforated note-sheet forward over the tracker-bar, a pneumatic guide opening appurtenant to the tracker-bar and arranged so that a lateral deviation of the note-sheet will uncover the same, a pneumatic motor connected to adjust the lateral relation between the note-sheet and tracker-bar, and connections between said guide opening and said pneumatic motor arranged so that when a lateral deviation of the note-sheet uncovers the guide-opening, the pneumatic motor will operate to restore the normal lateral relation between the tracker-bar and note-sheet before the forward run of the note-sheet in abnormal lateral position can produce discord.

23. The combination of a tracker bar having a series of music apertures, means for drawing a perforated note-sheet forward over the tracker bar, two pneumatic control openings appurtenant to the tracker bar and arranged so that a lateral deviation of the note-sheet in either direction will change the condition of one of said control openings, a pneumatic motor connected to adjust the lateral relation between the note-sheet and tracker-bar, and connections between said control openings and said pneumatic motor arranged so that when a lateral deviation of the note-sheet changes the condition of a control opening, the pneumatic motor will operate to restore the normal lateral relation between the tracker bar and note-sheet before the forward run of the note-sheet in abnormal lateral position can produce discord.

24. The following elements in combination: a tracker-bar, having a series of music apertures; two pneumatic guide-openings, appurtenant to the tracker-bar and arranged to be closed when the note-sheet is in its normal position; a music roll, comprising a roller, and a perforated note-sheet attached thereto; a drawing roll, to draw the note-sheet away from the music roll, across the tracker-bar; and two bellows-motors, each of which is worked by a pneumatic apparatus, and both of which are governed, but not worked, by means which include the two guide-openings, respectively, a connection, through which each of which motors works to slightly shift one of the rolls or the tracker-bar, whenever its guide-opening begins to be opened by a lateral tendency of

BEST AVAILABLE COPY the note-sheet; all the elements being combined and operating together, to cause the note-sheet to travel across the tracker-bar with constantly correct registration.

25. In combination with mechanism employing a traveling note-sheet; an adjustable tracker-bar, provided with two guide-openings, arranged to be closed by the note-sheet, when the latter is in its normal position; laterally adjustable means, for delivering the note-sheet across the tracker-bar; and two bellows-motors, each of which is worked by a pneumatic apparatus, and both of which are governed by means which include the two guide-openings respectively, and both of which engage with the tracker-bar and sheet delivering means, to effect their relative adjustment; and means for clamping either the tracker-bar or the sheet delivering means in place, whereby the other may be employed as the movable member.

26. In combination with mechanism employing a traveling note-sheet; a tracker-bar; two independent blocks clamped to the tracker-bar, each of which is provided with a guide-opening, and both of which guide-openings are arranged to be closed when the note-sheet is in its normal position; means for delivering the note-sheet across the tracker-bar; and two bellows-motors, each of which is worked by a pneumatic apparatus, and both of which are governed by means which include the two guide-openings, respectively, and both of which engage with the tracker-bar and sheet delivering means, for adjusting the relation of the tracker-bar and sheet delivering means, when the openings are respectively uncovered.

27. In combination with mechanism employing a traveling note-sheet; a tracker-bar, provided with two guide-openings, arranged to be closed by the note-sheet, when the latter is in its normal position; means for delivering the note-sheet across the tracker-bar, and two bellows-motors, each of which is worked by a pneumatic apparatus, and both of which are governed by means which include the guide openings, respectively, for adjusting the relation of the tracker-bar and sheet delivering means, when the openings are respectively uncovered.

JAMES O'CONNOR.

Witnesses:
GEO. W. GITTINS,
LOUIS W. SOUTHGATE.